Feb. 1, 1955  C. G. KOONTER  2,701,113
REARVIEW MIRROR FOR MOTOR VEHICLES
Filed June 27, 1949

INVENTOR.
Carlton G. Koonter
BY
A. E. Wilson
Attorney.

United States Patent Office 2,701,113
Patented Feb. 1, 1955

2,701,113

REARVIEW MIRROR FOR MOTOR VEHICLES

Carlton G. Koonter, Fairhaven, Mich.

Application June 27, 1949, Serial No. 101,571

3 Claims. (Cl. 248—205)

This invention relates to rear view mirrors for motor vehicles, and more particularly to universally mounted mirrors which can be readily adjusted vertically to permit a driver of a vehicle to observe traffic and road conditions behind the vehicle on both sides thereof.

My copending application Serial Number 97,174, filed June 4, 1949, now Patent No. 2,533,475, issued December 12, 1950, of which this is a continuation in part, discloses a rear view mirror having a readily operable adjustment between a mirror head assembly and a supporting base to permit the head assembly to be oscillated in a plane substantially perpendicular to the longitudinal axis of the supporting base and of the vehicle.

Rear view mirrors have of course been extensively used on motor vehicles to enable the driver to observe road and traffic conditions behind the vehicle. As such mirrors have been constructed heretofore it has been virtually impossible for a driver of a left hand drive vehicle to adjust a mirror on the right hand side of the vehicle in such a manner as to enable him to observe road and traffic conditions behind the vehicle on the right hand side. The same is of course true with drivers of right hand drive vehicles, in that it has been extremely difficult for them to adjust the mirror on the left hand side of the vehicle to enable them to observe conditions behind the vehicle on the left hand side.

Many attempts have been made to overcome these difficulties, and while dual rear view mirrors have been used on many vehicles, they are generally employed to give the vehicle a balanced appearance, the driver obtaining virtually no benefits from the mirror positioned on the side of the vehicle opposite the driver's compartment.

In an effort to enable a driver to observe conditions behind the vehicle on the side opposite the driver's compartment special supporting brackets have been employed to dispose the mirror at an appropriate angle that it can be viewed from the driver's compartment. These expedients have not met with commercial success because of the increased costs and other complications of providing left and right hand supporting brackets, and the fact that it has been impossible to design a single bracket that would be suitable for use on the various makes and models of vehicles.

I have now found that these difficulties can be completely overcome by providing an additional readily operable vertical adjustment between a mirror supporting arm and a supporting base whereby the mirror supporting arm and head assembly may be oscillated in a plane substantially parallel with the longitudinal axis of the supporting base and of the vehicle, regardless of the plane in which the base is mounted on the vehicle. Insofar as I know, no one has provided an adjustment in this location.

I have found that with this construction it is possible to provide a single rear view mirror assembly that can readily be used on opposite sides of the vehicle to enable the driver to observe traffic and road conditions behind and on both sides of the vehicle. It is therefore only necessary to provide a single set of tooling for manufacturing the mirror, and it is unnecessary to stock left and right hand mirror assemblies. Manufacturing and selling costs are thus minimized.

An object of this invention is therefore to provide an improved rear view mirror assembly wherein the mirror may be readily adjusted by oscillating the arm which supports the mirror assembly in a plane substantially parallel with the axis of the supporting base after it is mounted on a vehicle to position the mirror in any desired vertical location such that when positioned on either side of a vehicle, the driver of the vehicle can readily observe traffic and road conditions behind the vehicle.

A further object of this invention is to provide a rear view mirror of improved design having a manually operable vertical adjustment between a supporting arm and a base adapted to be secured to the vehicle, and wherein additional manually operable adjusting means are provided between the mirror head assembly and the supporting arm, and between the mirror and the supporting arm.

Another object of the invention resides in the provision of a finger tip adjustment between a mirror supporting arm and a supporting base whereby the vertical position of the head assembly relative to the vehicle may be readily adjusted after the assembly is mounted on the vehicle.

Still a further object of the invention is to provide an improved universal type mirror assembly having a minimum number of different parts, that can be manufactured economically, and which can be used on virtually all makes and models of vehicles.

Another object of the invention resides in the provision of a rear view mirror assembly having a supporting base adapted to be secured to the side of a vehicle, a supporting arm rotatably mounted on the base for adjustment vertically in a plane parallel to the longitudinal axis of the base and of the vehicle, and a head assembly rotatably mounted on the supporting arm for adjustment in a plane substantially perpendicular to the axis of the base to position the mirror in such a location that when used on either side of the vehicle, the driver can readily observe road and traffic conditions behind the vehicle.

Another object is to provide a rear view mirror having separately operable adjustments whereby the mirror may be readily adjusted angularly and vertically through wide limits to accommodate it to individuals varying widely in stature to enable drivers to readily observe rear road and traffic conditions on both sides of the vehicle.

Further objects and advantages of the invention will be apparent from the following description, taken in connection with the appended drawings, in which.

Figure 1:
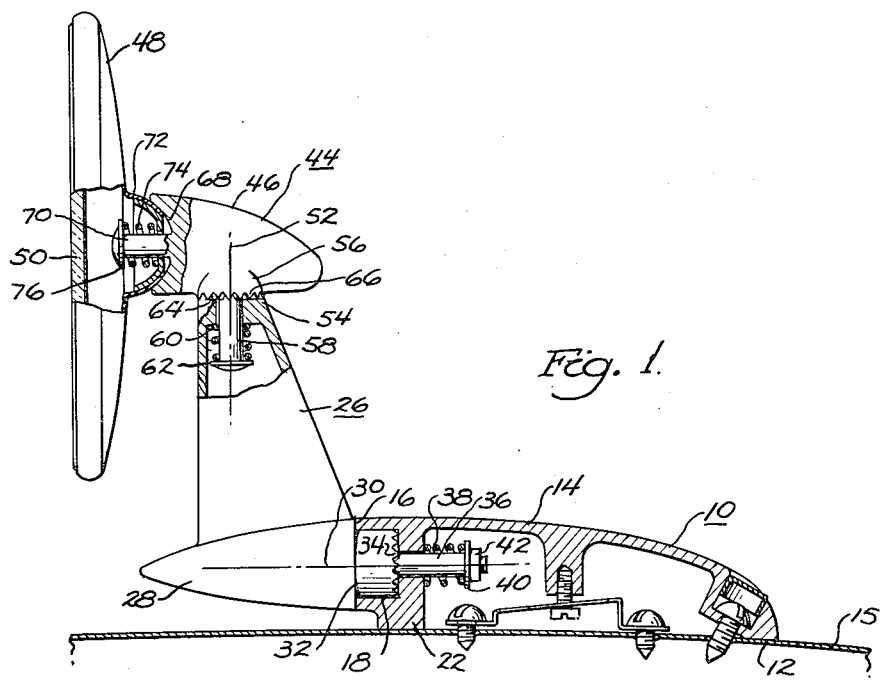
Fig. 1 is a longitudinal sectional view of a rear view mirror assembly embodying my invention.
Figure 2:
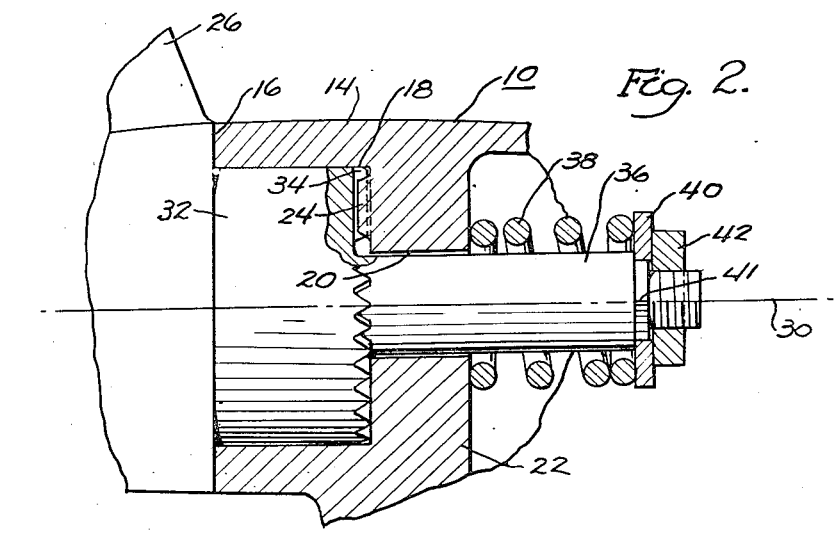
Fig. 2 is a fragmentary enlarged sectional view of a portion of the assembly illustrated in Fig. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to the drawings it will be noted that the rear view mirror assembly includes a supporting member or base 10 having a longitudinal axis 12 extending longitudinally in the direction of travel of the vehicle. The base 10 may be formed in any desired manner as by die casting, and preferably has an elongated hollow body 14 adapted to be secured in any desired manner to a door, side panel, hood or fender illustrated diagrammatically at 15, of any motor vehicle. The base member 10 may be secured to the vehicle in the manner illustrated in my copending application Serial Number 97,174 referred to above, or any other suitable fastening means may be employed.

The rear end 16 of the body 14 has a cylindrical axially extending recess 18 terminating in a smaller cylindrical recess 20 extending through a wall 22 formed at the rear end 16 of the body 14. The bottom of the recess 18 is provided with a plurality of spaced radially extending serrations 24 extending outwardly from the recess 20.

A mirror supporting arm 26 preferably having a rearwardly tapering or streamlined portion 28 is rotatably mounted in the base 10 for oscillating adjustment therein about an axis 30 extending substantially parallel with the longitudinal axis 12 of the base 10 and of the vehicle to which the mirror assembly is adapted to be secured.

The forward end of the portion 28 of the supporting arm 26 is formed with a cylindrical axially extending projection 32 adapted to extend into the recess 18 in the body 14 of the base 10. The end of the projection 32 is formed with a plurality of spaced radially extending serrations 34 adapted to engage the serrations 24 formed in the body 14.

Means interposed between the forward end of the portion 28 of the supporting arm 26 and the body 14 of the base 10 may be provided to yieldingly maintain the members in the assembled position as shown in Fig. 1. One illustrative example of such means includes an extension 36 carried by the portion 28 of the supporting arm 26 and extending through the recess 20 in the wall 22. A spring 38 surrounding the extension 36 is tensioned between the rear surface of the wall 22 and a washer 40 having a square recess to engage a square section 41 near the rear end of the extension 36 to prevent relative rotation between the washer and the extension. Suitable fastening means such as a nut 42 threaded on the rear end of the extension 36 are provided to maintain the parts in the assembled position with the spring 38 subjected to a desired degree of preload.

The supporting arm 26 is thus securely fastened in the base 10, the projection 32 of the supporting arm 26 fitting within the body 14 to maintain desired alignment between the base 10 and the supporting arm 26. The spring 38 urges the arm 26 and the base 10 into firm contact thereby cooperating to maintain desired alignment. The cooperating serrations 24 and 34 carried by the base 10 and supporting arm 26 and base 10 into firm contact thereby cooperating position to which it is moved relative to the base 10, the spring 38 yielding to permit relative movement between the serrations 24 and 34 when the supporting arm 26 is forcibly moved to change its angular position relative to the base 10.

The arm 26 extends outwardly from the base 10 and the side of a vehicle to which the assembly is secured and supports a mirror head assembly 44, for universal angular adjustment relative thereto about the axis 30 extending substantially parallel with the axis 12 of the base 10 and of the vehicle. The head assembly 44 has a body portion 46 to which a mirror 48 is mounted for universal angular adjustment relative thereto. The shell 48 supports the glass 50 of a mirror in a known manner.

The arm 26 may have the body portion 46 of the head assembly 44 formed integrally therewith as is conventional with present day mirrors. If desired the body portion 46 may be mounted on the supporting arm 26 for angular adjustment relative thereto about an axis 52 extending substantially perpendicular to the axis 12 of the base 10 as disclosed in my copending application Serial Number 97,174.

Where this expedient is resorted to arm 26 terminates in a substantially round support 54, and the body portion 46 of the head assembly 44 is provided with a similar substantially round portion 56 adapted to engage the round support 54 of the arm 26. A round extension 58 carried by the body portion 46 of the head assembly 44 extends through an aperture in the support 54 of the arm 26 to receive a spring 60 held in a tensioned position on the projection 58 as disclosed in connection with the spring 38 or by the flared end of the projection engaging a washer 62 surrounding the projection 58. Cooperating serrations 64 and 66 formed on the support 54 of the arm 26 and by the round portion 56 of the head assembly 44 are provided to hold the head assembly in any angularly adjusted position to which it is moved about the axis 52 extending substantially perpendicularly to the longitudinal axis 12 of the base 10.

The angular relation of the head assembly 44 relative to the base 10 can of course be varied as desired by grasping the head assembly 44 and rotating it about the axis 52 of the projection 58, the spring 60 being compressed as the serrations 64 and 66 move relative to each other. The spring 60 holds the head assembly 44 in any angularly adjusted position to which it is moved relative to the base 10 with a sufficient force to prevent the head assembly from being unintentionally moved out of adjusted position by bumps or vibration to which the vehicle is subjected.

The body portion 46 of the head assembly 44 is provided with a spherical recess 68 having a projection 70 extending from its center at an appropriate angle to provide advantageous adjustment, such as at right angles to the projection 58 by which the head assembly is mounted on the supporting arm 26.

The mirror shell 48 is provided with a spherical portion 72 adapted to project into the spherical recess 68, and be retained therein by a spherical washer, preloaded by a spring 74 surrounding the projection 70, and held in place by a washer 76 retained in place by the flanged end of the projection 70.

The mirror may of course be adjusted angularly relative to the body portion 46 by grasping the shell 48 and moving it angularly relative to the body portion 46, the spring 74 retaining the shell in any angularly adjusted position to which it is moved.

The longitudinal axis 12 of the base 10 extends substantially in alignment with the longitudinal axis of the vehicle. By rotating the supporting arm 26 about the axis 30 of the portion 28 extending parallel with the longitudinal axis 12 of the base 10, and by rotating the head assembly 44 about the axis 52 of the projection 58 the vertical position and the angular relation of the body portion 46 may be adjusted about axes extending substantially parallel and perpendicular to the axis 12 of the base 10 and of the vehicle. The mirror may of course also be adjusted angularly relative to the body portion 46 of the head assembly 44 by moving the mirror shell 48 relative to the body portion 46. A pair of mirrors mounted on a vehicle may thus be readily adjusted to permit the driver to observe rear road and traffic conditions on both sides of the vehicle. Since such a large range of adjustment is provided, my improved mirrors may be readily adjusted to meet the requirements of individual drivers varying widely in stature.

It will of course be understood that my invention is not limited to a construction wherein the adjustment of the supporting arm 26 and the base 10 are in a plane parallel with the vehicle contacting portion of the base 10. The angular relation of the contacting surfaces defined by the axis 30 between the base 10 and the arm 26 may be varied approximately 45° to each side of the parallel relation relative to the axis 12 of the base 10 without departing from the spirit of my invention.

It will also be apparent that my multiple adjustment feature of a rear view mirror may be employed with mirrors having conventional supporting arms, and is not limited to mirrors having supporting bases of the so-called panel type.

I claim:

1. A rear view mirror for a motor vehicle body, comprising a two-part elongated streamlined base member having a rigid section adapted to be affixed to the body of said vehicle and a longitudinally pivoted end portion, an arm on said longitudinally pivoted end portion, said rigid and pivoted portions being provided with mutually engaging serrated surfaces having a longitudinal axis, spring means for yieldingly urging said surfaces into interlocking engagement to hold said arm in an adjusted position, a mirror shell, an intermediate member for pivotally connecting said mirror shell to the outer end of said arm on a transverse axis, mutually engaging serrated surfaces between the end of said arm and the intermediate member, and spring means for yieldingly urging said surfaces into interlocking engagement, said mirror shell and intermediate member being provided with a spherical joint for universal adjustment of the mirror.

2. A rear view mirror according to claim 1 in which said longitudinally pivoted end portion is provided with a cylindrical portion of reduced dimensions adapted to be received in a correspondingly shaped socket in the rigid section.

3. A rear view mirror according to claim 1 in which the pivoted end portion is provided with a cylindrical reduced extension adapted to be slidably and rotatably received in a correspondingly shaped socket in said rigid section.

References Cited in the file of this patent

UNITED STATES PATENTS

| | | |
|---|---|---|
| 1,932,697 | Jankovic | Oct. 31, 1933 |
| 2,138,808 | Putterman et al. | Nov. 29, 1938 |
| 2,293,303 | Morley | Aug. 18, 1942 |
| 2,452,316 | Morley | Oct. 26, 1948 |
| 2,457,479 | Lipuma | Dec. 28, 1948 |
| 2,458,117 | Tolbert | Jan. 4, 1949 |
| 2,533,475 | Koonter | Dec. 12, 1950 |